Nov. 5, 1968 L. V. MYERS 3,408,723
METHOD OF EXPANDING MULTI-HARDNESS PANELS
Filed March 24, 1965 2 Sheets-Sheet 1

INVENTOR.
LYELL V. MYERS
BY Robert H. Bachman
ATTORNEY

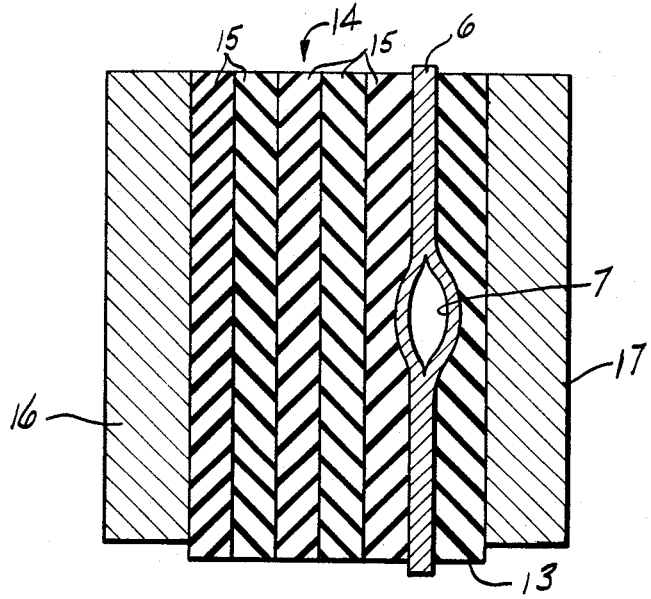
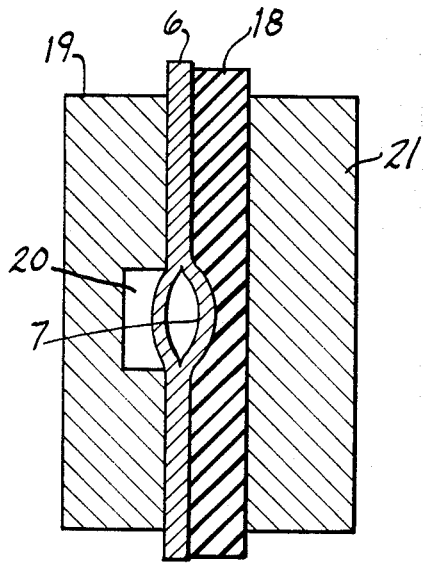
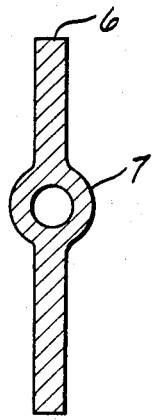

United States Patent Office 3,408,723
Patented Nov. 5, 1968

3,408,723
METHOD OF EXPANDING MULTI-HARDNESS PANELS
Lyell V. Myers, Hazelwood, Mo., assignor to Olin Mathieson Chemical Corporation, a corporation of Virginia
Filed Mar. 24, 1965, Ser. No. 442,256
13 Claims. (Cl. 29—157.3)

ABSTRACT OF THE DISCLOSURE

A method of expanding to a desired configuration a partially expanded passageway within a panel, said passageway having opposed sides of materials of different hardness, the method comprising positioning at least one restraining pad on each side of said passageway, said restraining pads being of a hardness to limit expansion of the side of the passageway on which it is positioned to a desired extent relative to the expansion of the opposed side, applying clamping forces to each of said restraining pads, and inserting into said passageway a tool having the desired configuration to expand said unexpanded passageway.

---

This invention relates generally to the fabrication of hollow articles and more specifically to a method of accurately expanding a hollow article adapted for use as a heat exchanger.

As is known in the art, a sheet-like structure having internal hollow passageways is well adapted for use as a heat exchanger wherein a heat exchange medium is to be circulated throughout the structure. One method which is particularly well adapted to producing such devices is that disclosed in U.S. Patent No. 2,690,002, issued Sept. 28, 1954, and known in the art as the Roll-Bond process. In the practice of the invention disclosed in the aforesaid patent, a structure is provided to which necessary connections may be made for the circulation of heat exchange media. Such connections, for example those required for circulation of a refrigerant, are desirably of a precise configuration so that standard connections may suitably fit the heat exchange structures. For example, in U.S. Patent No. 2,822,151, issued Feb. 4, 1958, there is disclosed a plate-like heat exchanger to which a single connection may be made for both entry and exit of the circulating refrigerant.

In an application such as in a household refrigerator, it has been found desirable to produce the heat exchanger with one side harder than the other. The harder side may then be positioned where severe treatment is to be expected, such as from ice-cube trays or sharp instruments used in removing ice. Thus, the heat exchanger, and accordingly the hollow passageways within the heat exchanger, may be of a bi-alloy construction, with one side thereof of a hardness different from the other side. As examples of materials that may be used in such a bi-alloy heat exchanger, the hard side may be an X8040 alloy, and the soft side an aluminum alloy such as 1100 alloy. Such construction causes production difficulties in precisely expanding, or "sizing," the internal passages so as to closely receive standard connections. Specifically, the use of known expedients in sizing a bi-alloy heat exchanger produces uneven distension of the internal passageways on the two sides thereof. For example, were such a bi-alloy heat exchanger to be expanded by fluid pressure, or by the use of a standard sizing tool, the unequal hardness of the two sides of the device would of course result in unequal distension on each of the sides.

Another method of sizing such passageways which has been suggested is the use of a non-symmetrical tool which, when used with a bi-alloy heat exchanger, is calculated to yield a symmetrical configuration of the passageway. Such tools are of high fragility, and it is necessary to very accurately locate the tool with respect to the hard side of the restrictor.

According to the instant invention it has been found that the sizing of the passageways within such a bi-alloy heat exchanger may be accomplished by positioning on each side of the passageway a restraining pad of a hardness calculated to limit the expansion of the side of the passageway on which it is positioned to the desired extent. Thus, by appropriately varying the hardness of the pads on each side of the passageway, a completely expanded passageway of a given configuration may be attained.

This invention is directed primarily to the expansion of metal panels from blanks fabricated within unjoined interior portions, but the invention is equally applicable to similar panels fabricated from materials other than metals, such as various plastics, and to panels fabricated from dissimilar materials such as metal and a plastic joined together with an unjoined portion between the sheets.

It is accordingly an object of this invention to provide an improved method of fabricating hollow articles.

It is a further object of this invention to provide a method of fabricating such hollow articles having hollow passageways therein comprised of materials of different hardness.

It is a further object of this invention to provide a method of producing such a device wherein the internal passageway may be appropriately sized to receive standard connections for circulation of heat exchange media.

Other objects and advantages will become apparent to those skilled in the art as a detailed description of a particular embodiment proceeds with reference to the drawings which form a part hereof, and in which:

FIGURE 6 is a perspective view of a suitable tool used in sizing the passageway of the heat exchanger of FIGURE 4;

FIGURE 7 is a cross-sectional view through the passageway of the device of FIGURE 4, showing one form of controlling the complete expansion of the walls of the passageway;

FIGURE 8 is a cross-sectional view similar to that of FIGURE 7 showing a second method of controlling the complete expansion of the passageway walls; and FIGURE 9 is a cross-sectional view similar to FIGURES 7 and 8 showing the heat exchanger with the passageway completely expanded.

Figure 1:
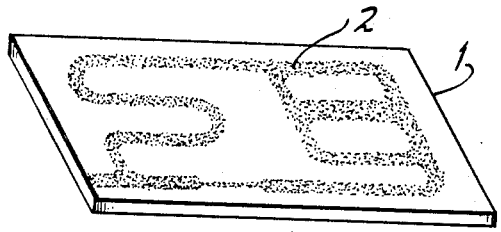
FIGURES 1–3 depict schematically a process for forming a blank from which a heat exchanger according to this invention may be formed.
Figure 2:
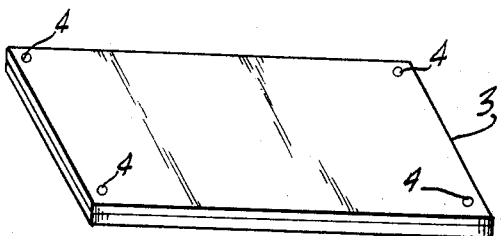
Figure 3:
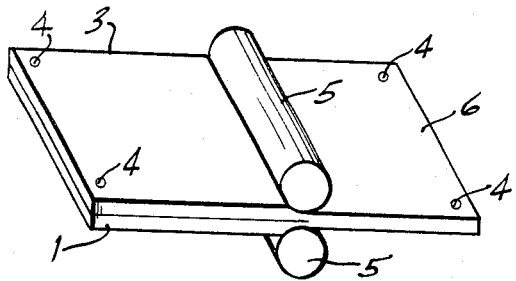

Referring to the drawing, FIGURES 1–3 depict by way of example one method by which a plate-like heat exchanger having internal passageways may be produced. While the instant invention is applicable to any sheet-like structure having internal passageways, the method of production disclosed in the aforementioned U.S. Patent No. 2,690,002, is preferred. In accordance with such teachings, a first sheet of material 1 may have applied to one face thereof any desired pattern of stop-weld material 2, as shown in FIGURE 1. A second sheet of material 3 may then be superimposed upon the first sheet 1, as shown in FIGURE 2, and secured together as by spot welding 4 to prevent relative slippage of the adjacent surfaces of the sheets 1 and 3 during a subsequent welding operation. The sheets 1 and 3 may then be welded together throughout their contacting faces not separated by stop-weld material. For example, the superimposed sheets may be treated by hot rolling as shown in FIGURE 3. The superimposed sheets are first heated and then passed through rolls 5 between which they are reduced in thickness and elongated in the direction of rolling. The resultant blank 6 having an unjoined inner portion corresponding to the pattern of stop-weld material 2 may then be softened in any appropriate manner as by annealing, and thereafter the blank may be cold rolled to provide a more even thickness and again annealed.

Figure 4:
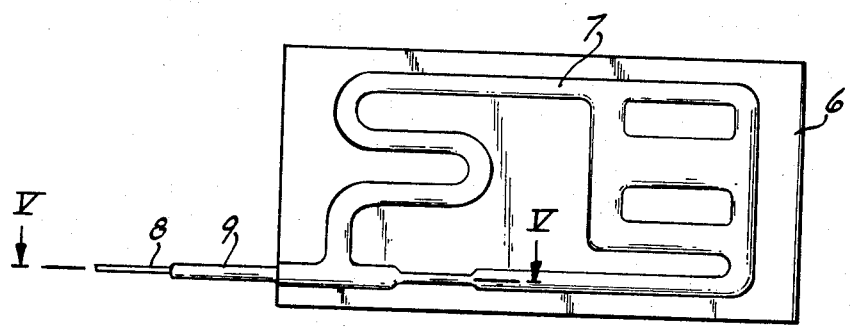
FIGURE 4 is a plan view of a heat exchanger expanded from the blank produced by the process of FIGURES 1–3, and showing a suitable connection for circulation of a heat exchange medium.

As is known in the art, such a method of producing a heat exchanger requires that a portion of the stop-weld material be adjacent an edge of the sheet so that the internal passageway desired may be expanded by introduction of fluid pressure therethrough. As disclosed in the aforementioned U.S. Patent No. 2,822,151, it is particularly advantageous to form the pattern of stop-weld material so that the resulting expanded passageway may circulate a heat exchange medium which both enters and exits at the same point. Such a device is depicted in FIGURE 4 of the drawings and may comprise a blank 6 produced according to the method indicated above, in which the pattern of stop-weld material 2 has been inflated by introduction of fluid-distending pressure in a manner known in the art to form a system 7 of internal hollow passageways. Concentrically oriented tubes 8 and 9 may then be inserted for appropriate circulation of a refrigerant through the passageway 7.

Figure 5:
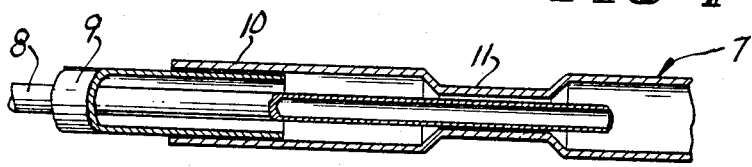
FIGURE 5 is a cross-sectional view of a portion of FIGURE 4 taken along the lines V—V thereof.
Figure 5A:
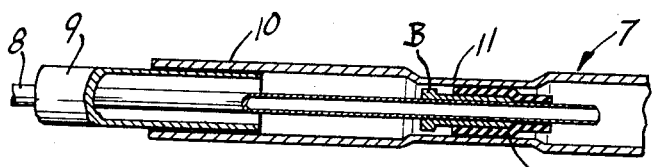
FIGURE 5A is a cross-sectional view similar to FIGURE 5 illustrating a modification thereof.

Such an expedient is shown more in detail in the cross-section of FIGURE 5. As can there be seen, the passageway 7 may include an enlarged portion 10 near an edge of the sheet and a connecting restricted portion 11. The inner of the concentric tubes 8 may then be inserted into the restricted portion 11 and employed for introduction of the heat exchange medium, for example a refrigerant. The refrigerant is then circulated throughout the passageway 7, returning within the portion 10 from which it may exit through the outer tube 9. It will be evident that the tubes 8 and 9 may take any desired form, those shown being merely exemplary. It is necessary that the tube 8 mate correctly with the interior of the passageway 11 to prevent "leak-back" of the refrigerant; such leak-back may cause poor performance and collection of moisture on the outlet tubes as the refrigerant goes through its cycles of off and on. Accordingly, if so desired, a grommet and bushing may be employed to ensure an effective seal. Such an expedient is illustrated in FIGURE 5A, wherein a cylindrical bushing B, which may be of metal, with a surrounding cylindrical grommet G, which may be of a sponge rubber tubing, is inserted approximately midway of the restricted portion 11 prior to insertion of the tube 8. In any event, it is necessary that the passageway be correctly expanded so as to fit with the connection which is intended to be employed in any particular application.

As indicated hereinbefore, opposing sides of the described heat exchangers may be of different alloys. Accordingly, initial expansion of the passageway 7, whether by fluid pressure or by introduction of a mandrel or the like, would yield differing expansion of the two sides of the passageway. As the standard connections for circulation of the refrigerant are of a symmetrical configuration, it is desirable that the portion of the passageway to receive such a connection also be of a symmetrical configuration. In accordance with this invention, a method is provided for controlling the expansion of such a passageway in response to introduction of a usual symmetrical sizing tool, for example that shown in FIGURE 6, and identified by the reference character 12. Accordingly, following initial inflation of the passageway 7, the blank 6 may be positioned between two restraining pads 13 and 14, as shown in FIGURE 7. Any suitable deformable material is satisfactory for use of the pads 13 and 14; for example, solid or sponge rubber may be employed. A first pad 13 is positioned against the passageway 7 on the soft side thereof. A second pad 14 of a hardness less than that of 13 is positioned against the hard side of the passageway 7. The pad 14 may be a single layer of material of a hardness less than that of 13, or a greater number of pads 15 of equal hardness may be employed. As shown in FIGURE 7, pad 13 may for example a .100 in. thick sheet of rubber of 60 durometer hardness, and the pad 14 may comprise five of such sheets 15 to obtain a pad of .500 in. thick 60 durometer hardness. Back-up plates 16 and 17 may then be positioned about the assembly and clamping forces exerted therethrough. When so compressed, it will be evident that the hard side of the passageway 7 will, upon introduction of a symmetrical sizing tool, find less local resistance in the pad 14 than will the soft side of pasageway 7 find in the pad 13. Accordingly, by appropriate choice of the pads 13 and 14 a precise symmetrical configuration may be formed in the passageway 7, as shown for example in FIGURE 9.

A second modification of the instant method is depicted in FIGURE 8, wherein the pad 18 on the soft side is similar to pad 13 of FIGURE 7. Pad 14 of the former embodiment may be replaced by a fixture 19 of a relatively rigid construction having a cavity 20 adjacent the pasageway 7. As in the former embodiment, a back-up plate 21 may then be positioned against the pad 18. As will be evident, the cavity 20 allows for unrestrained expansion of the hard side of the passageway 7, while the pad 18 restrains to a precalculated amount the expansion of the soft side of the passageway 7. Again, proper choice of the thickness and/or hardness of the pad 18 and the dimensions of the cavity 20 will account for the desired expansion of the passageway 7.

It is to be understood that the instant invention may be utilized whenever a precise configuration of hollow passageway is desired. The "single-entry" pattern shown in the drawings is by way of example only. Similarly, the instant invention may be utilized on a blank produced by a method other than the Roll-Bond process. Additionally, the round configuration of the passageway shown is only one which may be achieved by the instant invention. By appropriate choice of the configuration of the sizing tool and of the construction of the restraining pad and/or fixtures, any desired configuration may be obtained. For example, if it is desired that one side be flat, the sizing tool may be of a semi-circular cross-section, and the restraining pad on one side be sufficiently hard to prevent any expansion of the passageway on that side.

It is to be further understood that the invention is not limited to the illustrations described and shown herein which are deemed to be merely illustrative of the best modes of carrying out the invention, and which are susceptible of modifications of form, size, arrangement of parts and detail of operation, but rather is intended to encompass all such modifications which are within the spirit and scope of the invention as set forth in the appended claims.

What is claimed is:

1. A method of expanding to a desired configuration a partially expanded passageway within a panel, said passageway having opposed sides of materials of different hardness, the method comprising (A) positioning at least one restraining pad on each side of said passageway, the total restraining force of the pads on one side of the panel being different from the total restraining force of the pads on the other side of the panel, said restraining pads being of a hardness to limit expansion of the side of the passageway on which it is positioned to a desired extent relative to the expansion of the opposed side, (B) applying clamping forces to each of said restraining pads, and (C) inserting into said passageway a tool having the desired configuration to expand said unexpanded passageway.

2. The method of claim 1 wherein said tool is symmetrical about a plane therethrough parallel to the plane of said panel.

3. A method of fabricating a hollow panel having opposed sides of different hardness and an internal passageway of a desired configuration, comprising (A) superimposing a first sheet upon a second sheet, said first and second sheets being of different hardness, (B) joining together said first and second sheets throughout their contacting surfaces except for a pattern corresponding to a desired internal passageway, and (C) expanding said pattern to form said passageway by
 (1) introducing fluid presure to partially expand said pattern,
 (2) positioning at least one restraining pad on each side of said partially expanded pattern, the total restraining force of the pads on one side of the panel being different from the total restraining force of the pads on the other side of the panel, said pad being of a hardness to limit expansion of the side of the pattern on which it is positioned to a desired extent relative to the expansion of the other side,
 (3) applying clamping forces to each said pad, and
 (4) inserting into said pattern a tool having the desired configuration to expand said pattern into the desired internal passageway.

4. The method of claim 3 wherein at least one of said pads is of a deformable material.

5. The method of claim 3 wherein each of said pads is of a deformable material, the pad on the side of said pattern of greater hardness being of a thickness greater than the pad on the side of said pattern of lesser hardness.

6. The method of claim 3 wherein one of said pads is of a deformable material and the other of said pads is of a substantially rigid material with a cavity therein to allow for expansion of said pattern.

7. A process according to claim 1 in which said tool completely expands the partially expanded passageway.

8. A process according to claim 3 in which said tool completely expands the partially expanded passageway.

9. A process according to claim 1 in which the expansion is substantially equal distant on both sides of the panel.

10. A process according to claim 3 in which the expansion is substantially equal distant on both sides of the panel.

11. A process according to claim 1 in which the expansion is not the same on one side of the panel as it is on the other.

12. A process according to claim 3 in which the expansion is not the same on one side of the panel as it is on the other.

13. The method of claim 1 in which one of said pads is of a deformable material and the other of said pads is of a substantially rigid material with a cavity therein to allow for expansion of said pattern.

References Cited

UNITED STATES PATENTS

| | | |
|---|---|---|
| 2,416,015 | 2/1947 | McGuffey. |
| 2,690,002 | 9/1954 | Grenell. |
| 2,951,404 | 9/1960 | Thomas. |
| 3,004,327 | 10/1961 | Keith et al. |
| 3,012,309 | 12/1961 | Meissner. |
| 3,037,277 | 6/1962 | Pauls. |
| 3,066,389 | 12/1962 | Jaeger. |
| 3,094,956 | 6/1963 | Pauls. |
| 3,106,014 | 10/1963 | Brick et al. |

JOHN F. CAMPBELL, *Primary Examiner.*

J. L. CLINE, *Assistant Examiner.*